United States Patent [19]

Barry

[11] 4,370,085
[45] Jan. 25, 1983

[54] ROTARY PARALLEL ARM LOADER AND SYSTEM

[76] Inventor: Leonard D. Barry, 19300 Pennington, Detroit, Mich. 48221

[21] Appl. No.: 66,687

[22] Filed: Aug. 15, 1979

[51] Int. Cl.³ .............................................. B65G 67/22
[52] U.S. Cl. ............................... 414/337; 414/744 R; 414/338; 414/339; 104/21; 104/31
[58] Field of Search ......................... 414/334, 337–339, 414/383, 525, 744 R; 198/480; 104/20, 21, 28–31; 105/368

[56] References Cited

U.S. PATENT DOCUMENTS

| | | | |
|---|---|---|---|
| 1,094,060 | 4/1914 | Donovan | 414/337 |
| 1,495,339 | 5/1924 | Maher | 414/337 X |
| 3,396,509 | 8/1968 | Hötger | 198/480 X |
| 3,484,002 | 12/1969 | Barry | 104/20 X |
| 3,865,041 | 2/1975 | Bacon | 104/20 |
| 3,896,738 | 7/1975 | Dubeta | 198/480 X |
| 3,956,994 | 5/1976 | Barry | 104/20 X |
| 3,991,889 | 11/1976 | Cox | 414/339 |
| 4,065,006 | 12/1977 | Barry | 414/337 X |
| 4,124,129 | 11/1978 | Barry | 104/28 X |
| 4,130,208 | 12/1978 | Barry | 414/334 |

Primary Examiner—Robert J. Spar
Assistant Examiner—Terrance L. Siemens

[57] ABSTRACT

This rotary loader has two vertical posts each with a rotary arm radiating therefrom with a load platform centered an equal distance out on each arm. The arms are coordinated to revolve parallel and move under and lift or lower together to transfer a load such as a cargo container or railway car body separable from its chassis. Each arm supports the end of a load on a pivot or turntable central of the width of the load. The turntables can be connected to form one platform and the pivots be above or below the load. Preferably the turntables are round and on a lobe of equal diameter on the end of each arm with a rubber rimmed disc wheel of slightly larger diameter of the pivot's axis below the arm to guide the arms of the loader to roll between pedestals or rabbets across the car's platform to couple and align the loader and car for transfer. The loader is vehicle mounted to engage stationary cars or load berths. The loader's arms can each have a hook, preferably retractable flush in the rim of the lobe, to be engaged by a hook on a car to couple and move the loader. Each arm is preferably a parallelogram linkage as viewed from a side and its outer link, a load bracket, supported on a wheel on a cam track concentric about the arm's pivot post. The loader with a cooperating conveyor places containers or car bodies side by side and reloads them back on a train. Car bodies are positioned end to station platform. With this loader, for example, a dining car body can be taken out from the middle of a passenger train and a sleeper or coach added in its place by a second loader without stopping the train.

20 Claims, 42 Drawing Figures

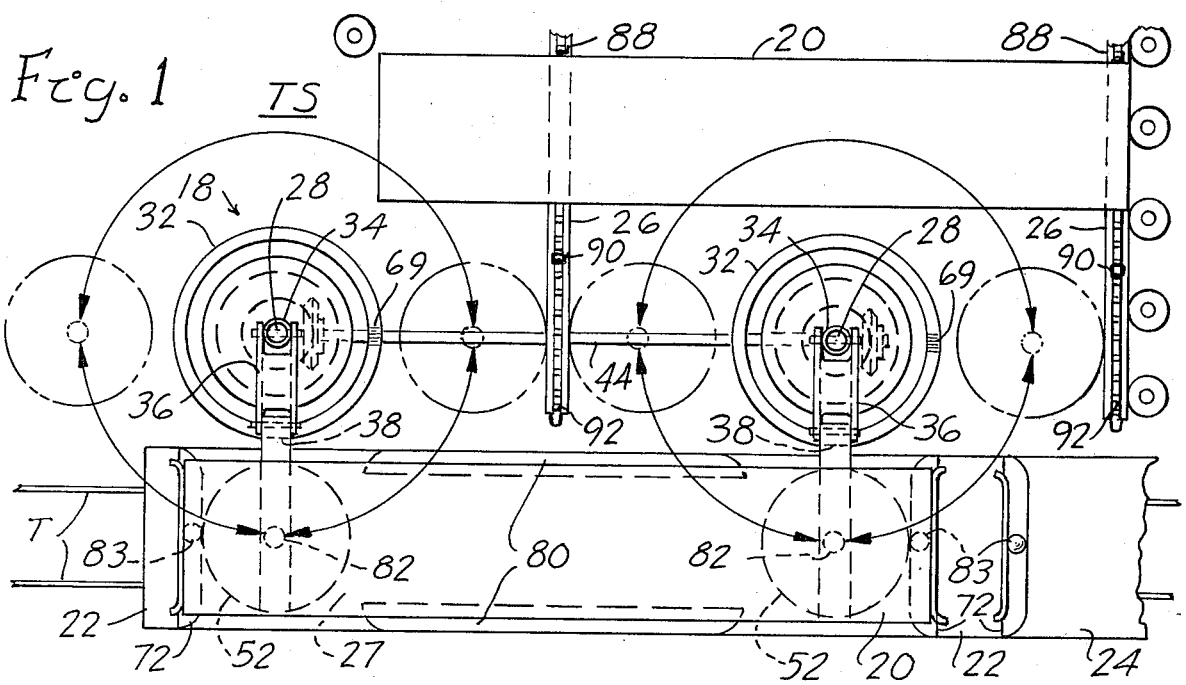
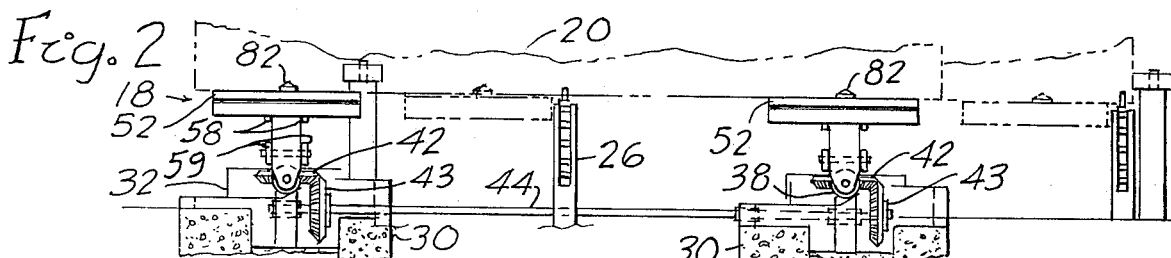
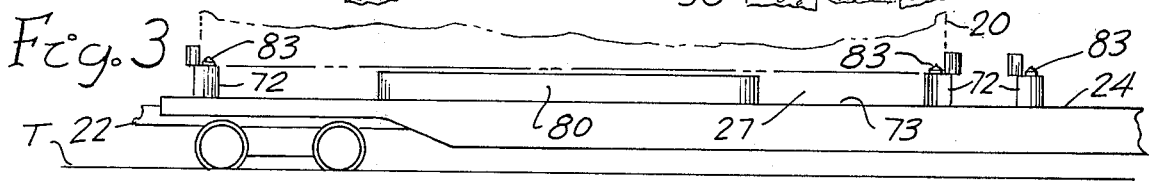
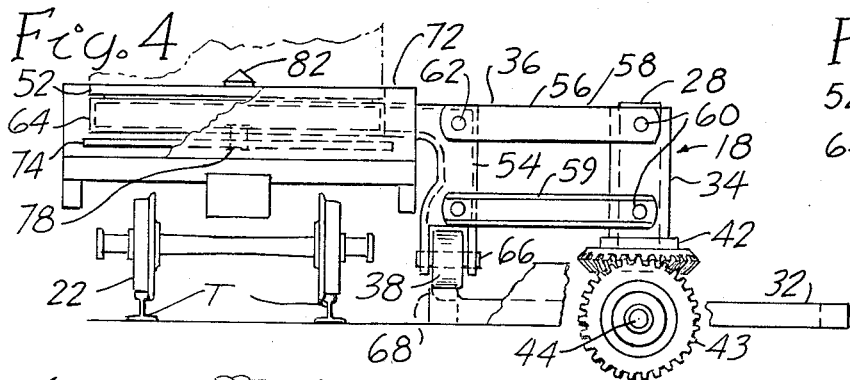
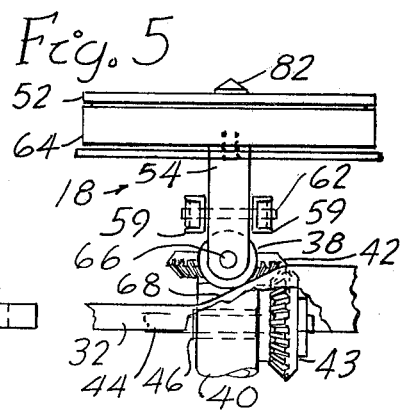
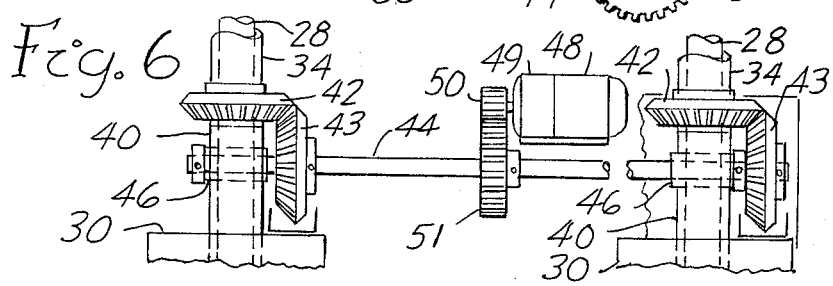
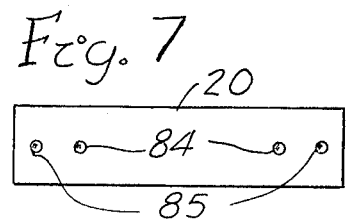

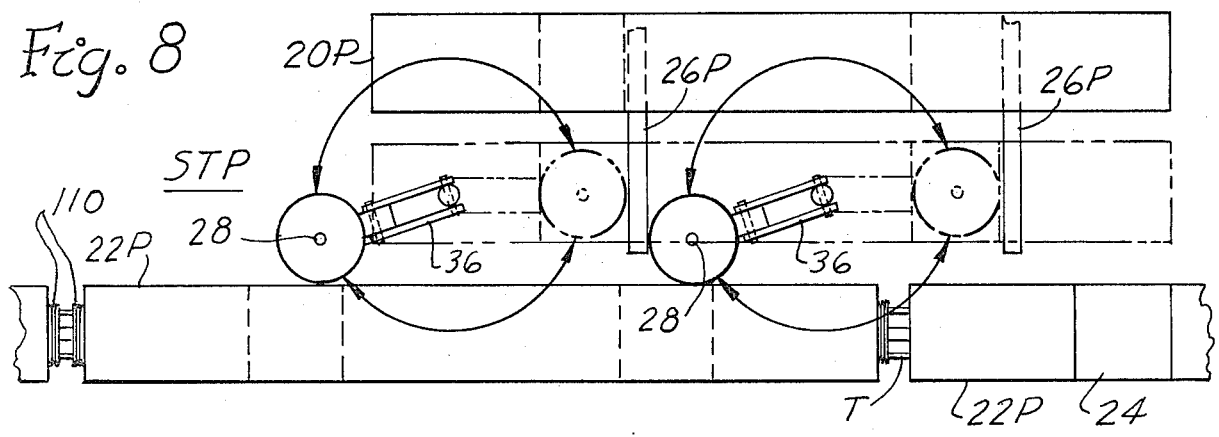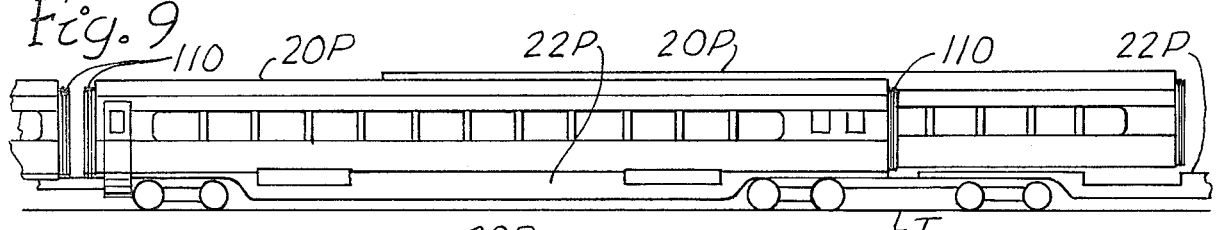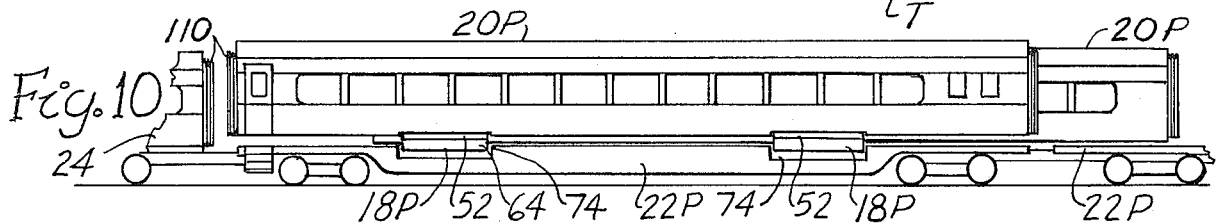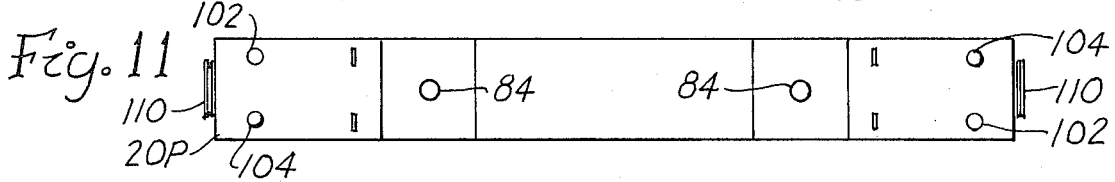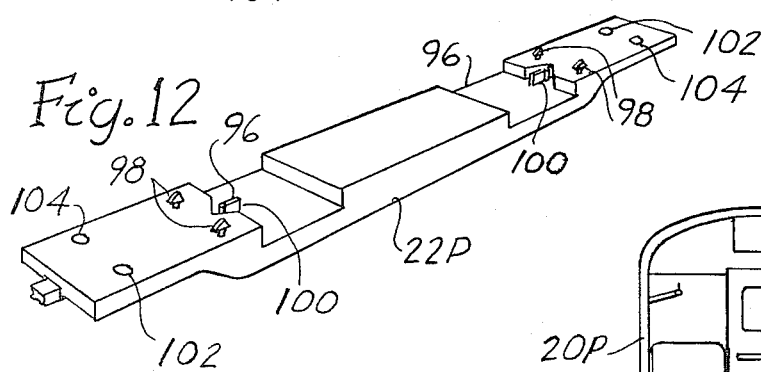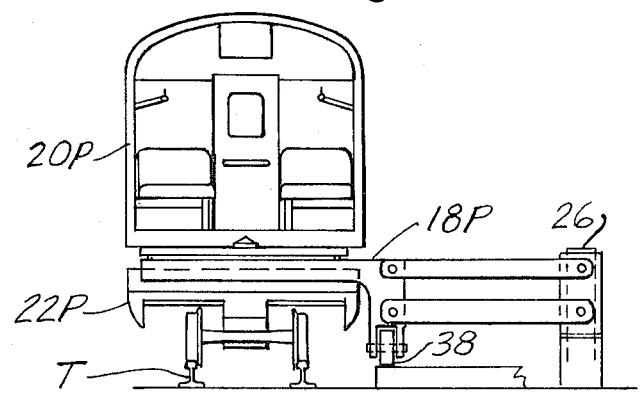

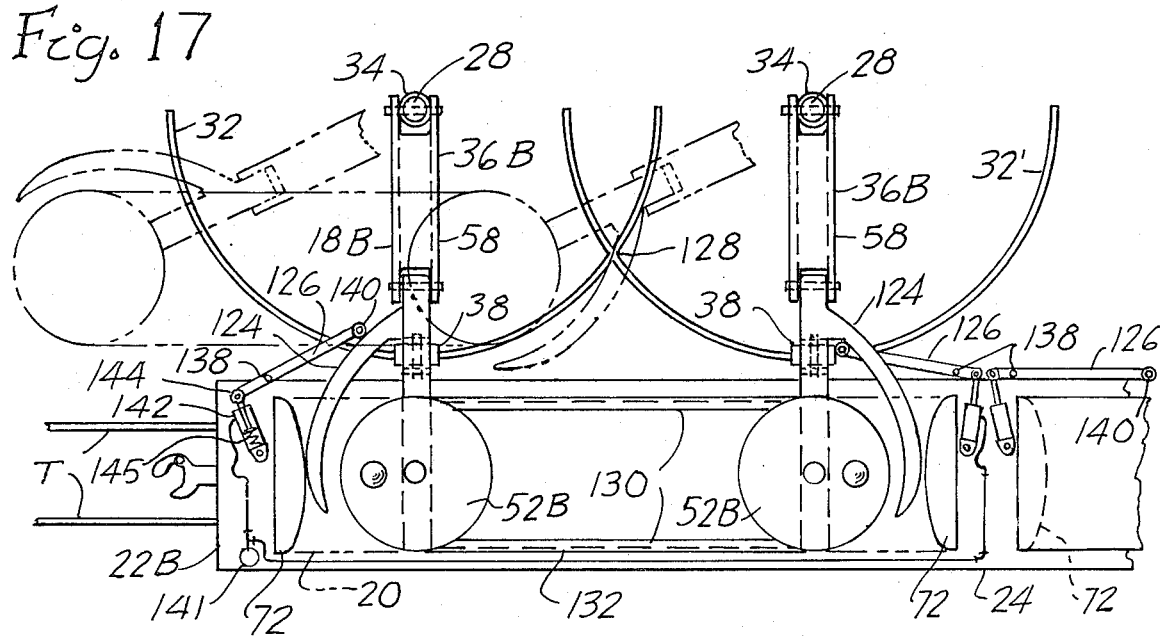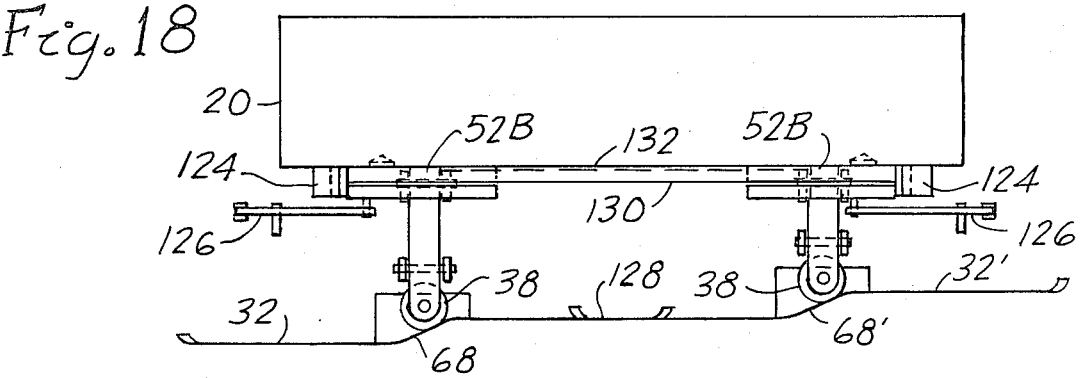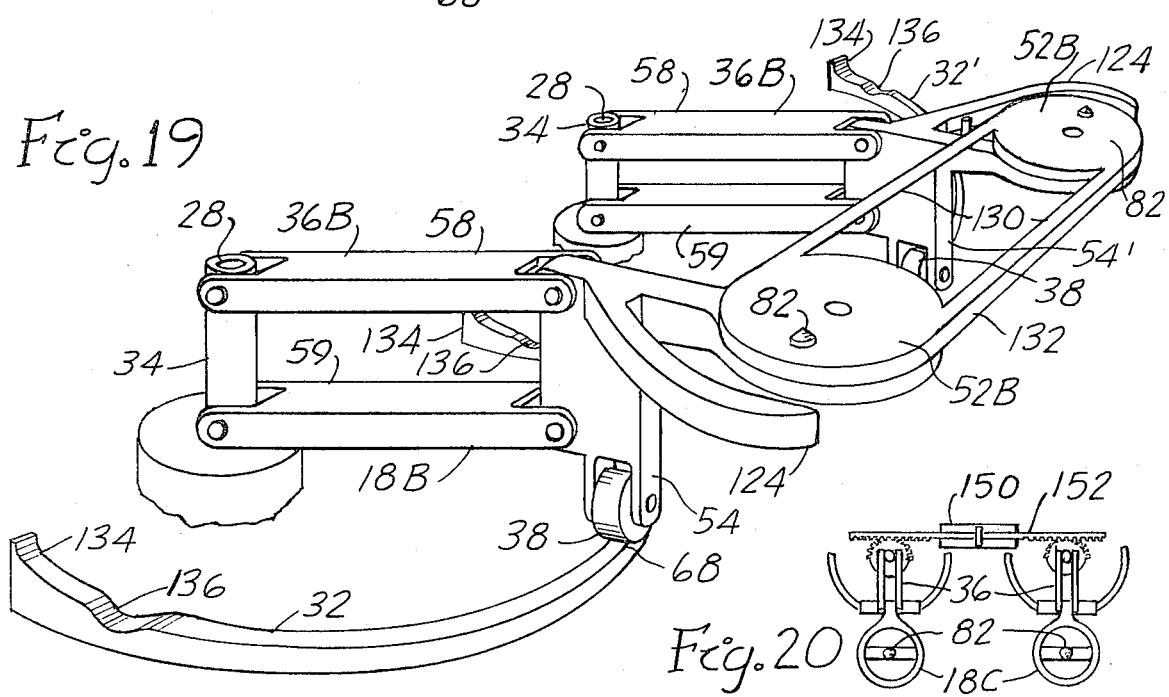

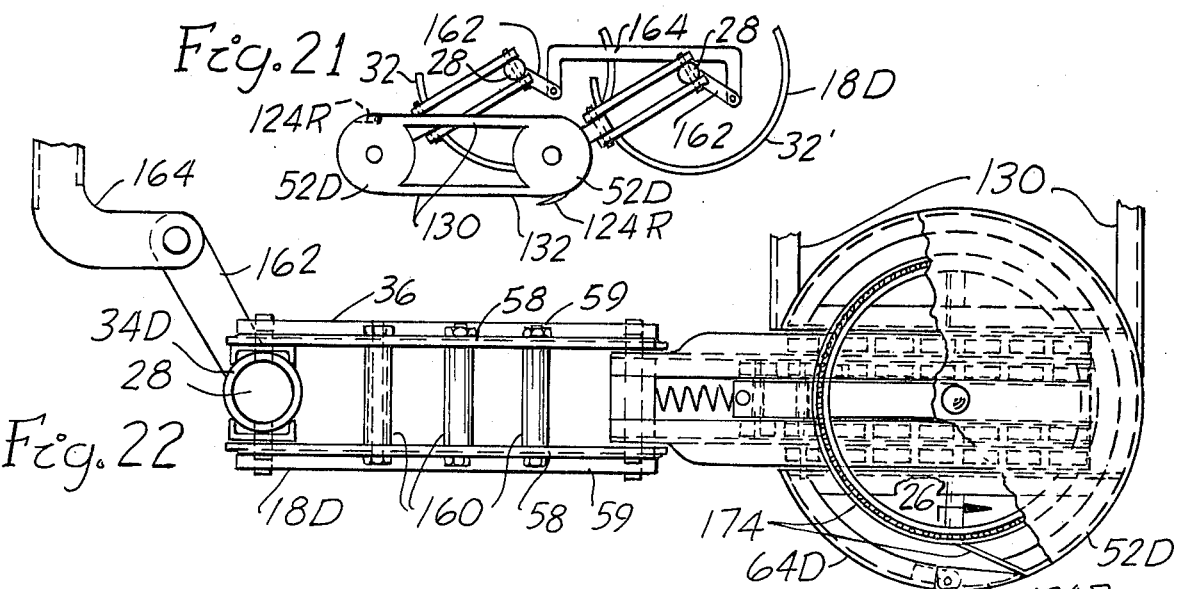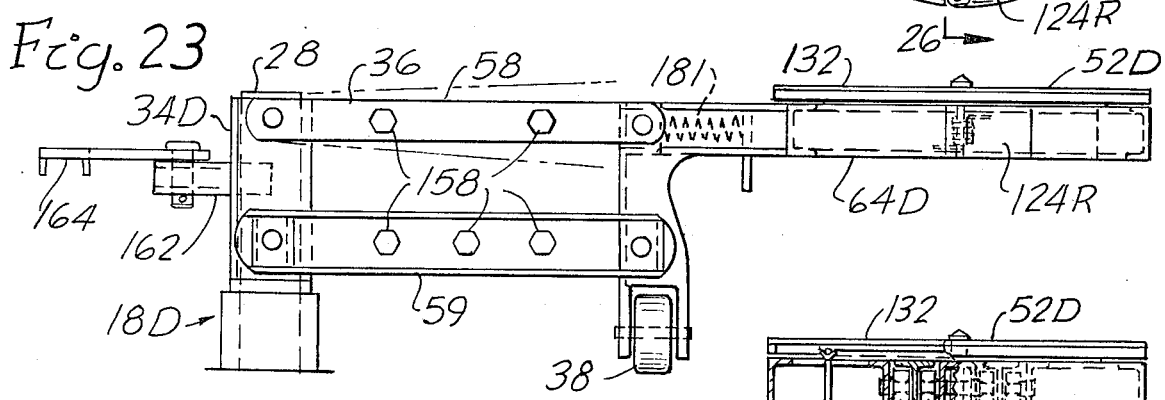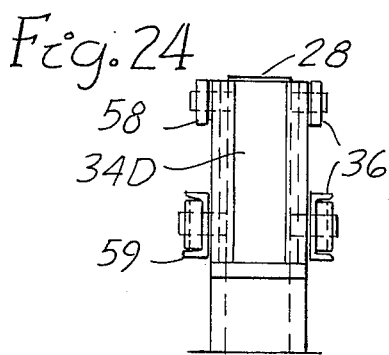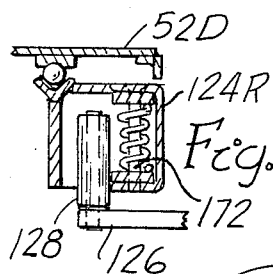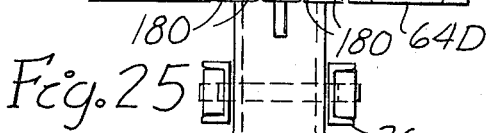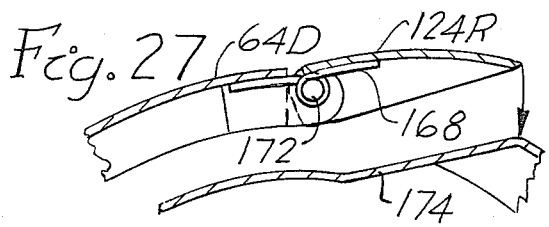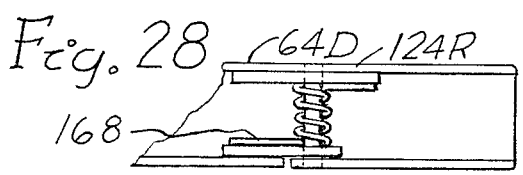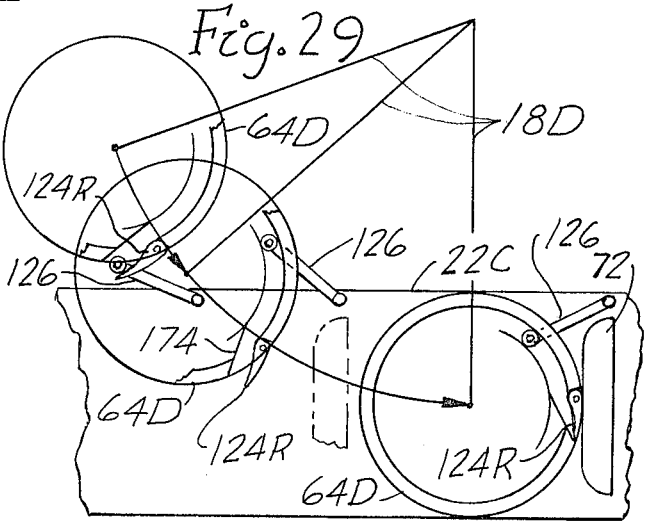

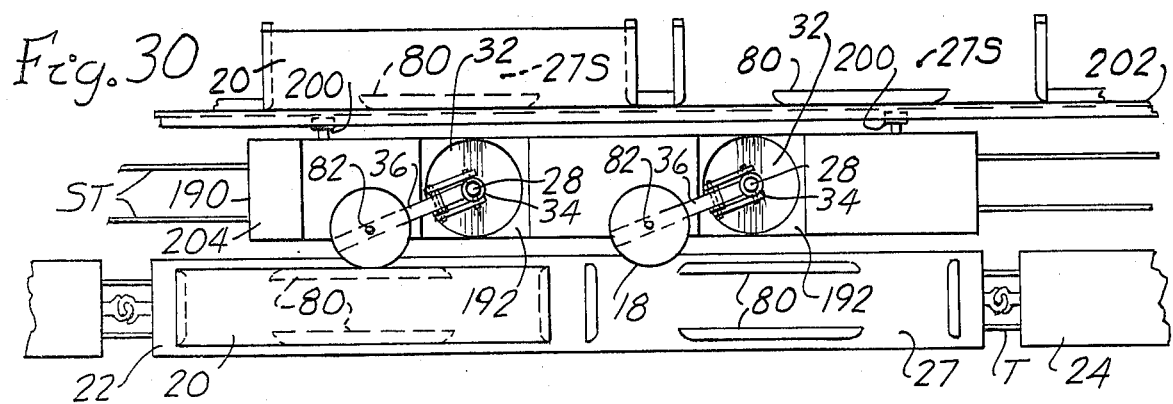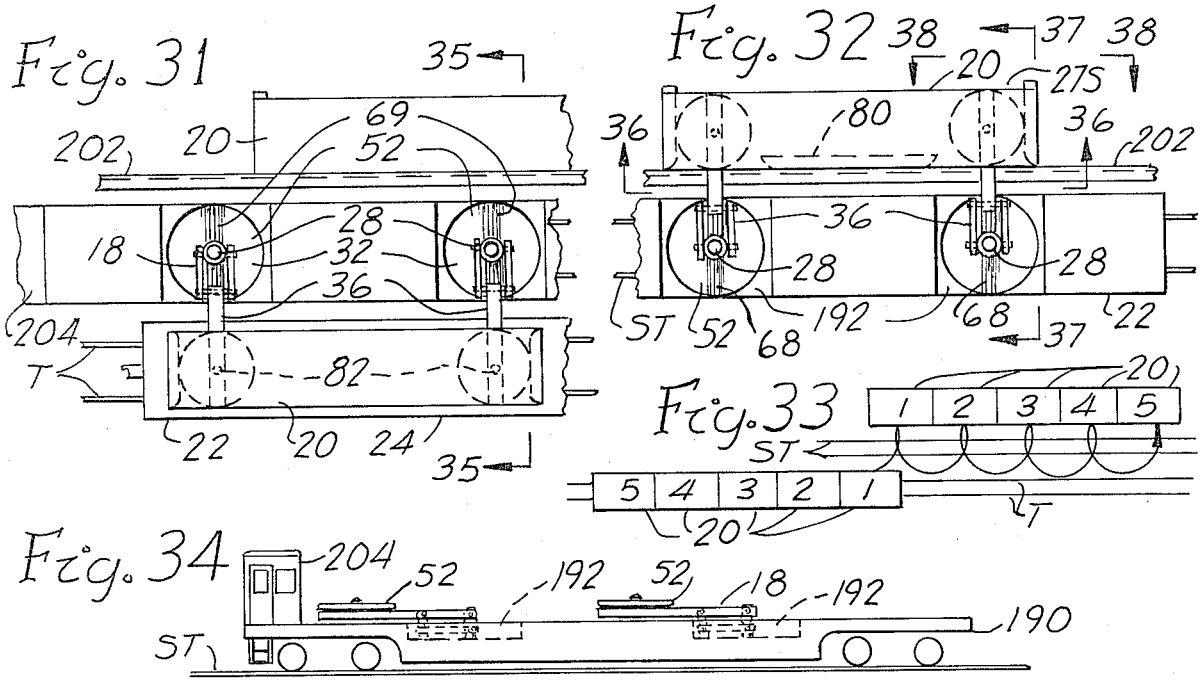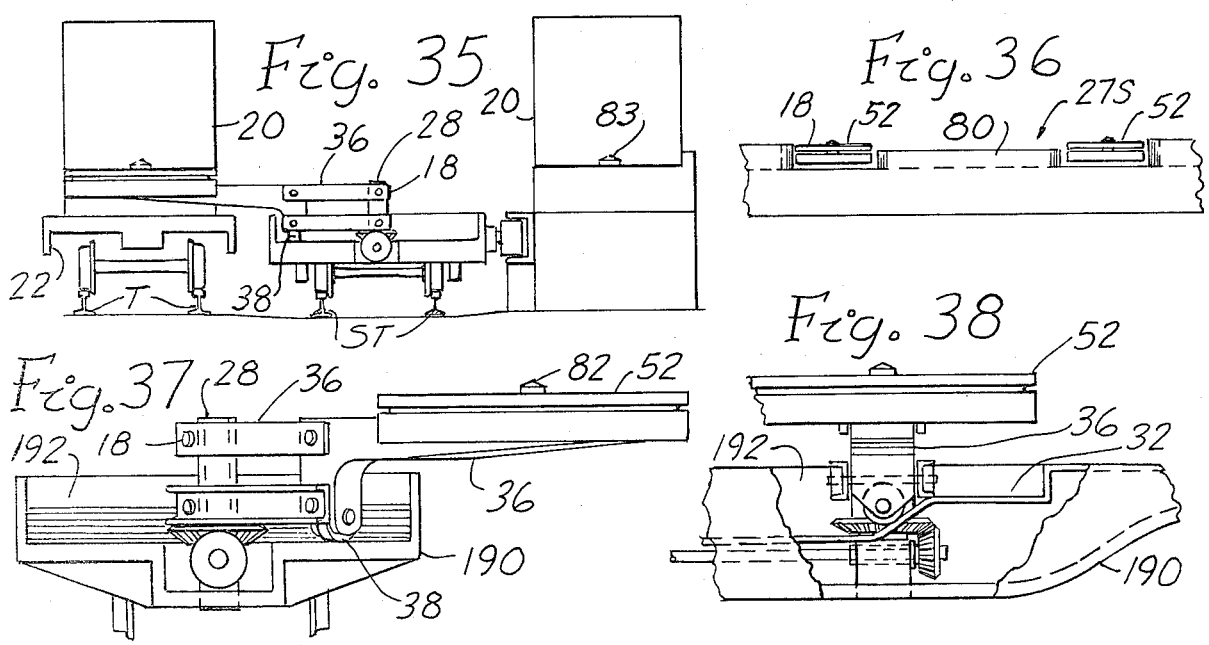

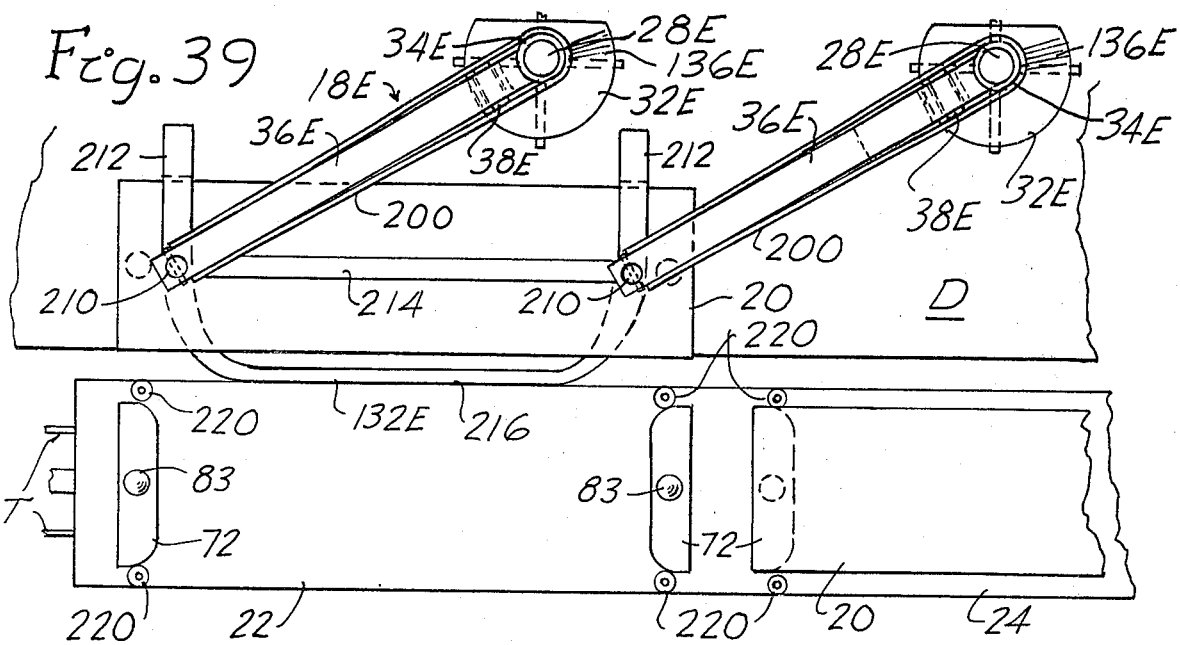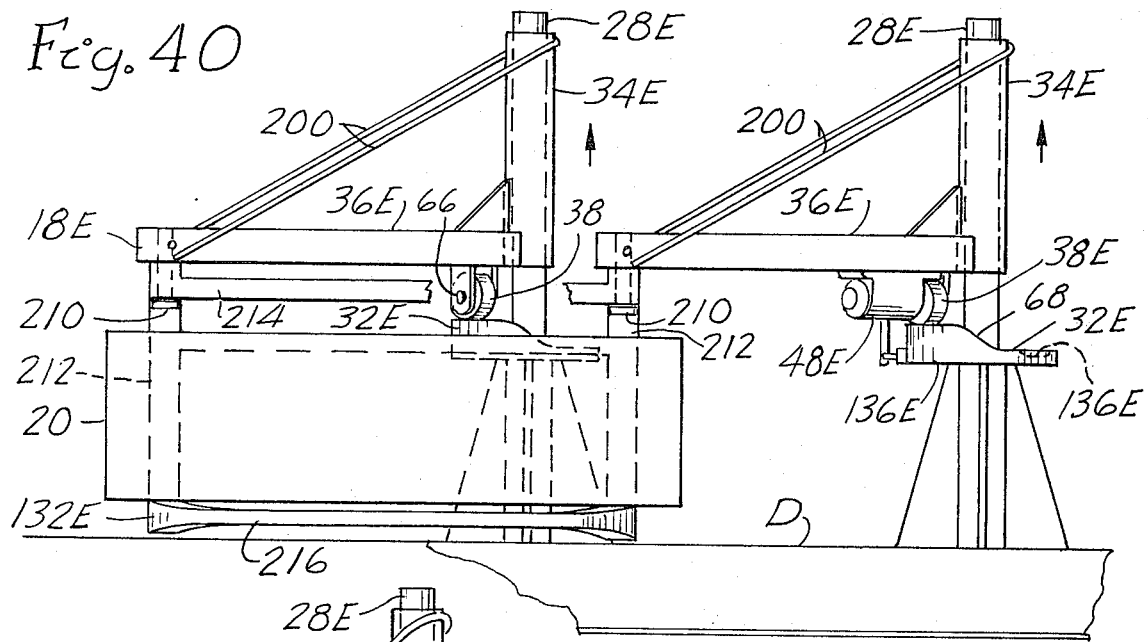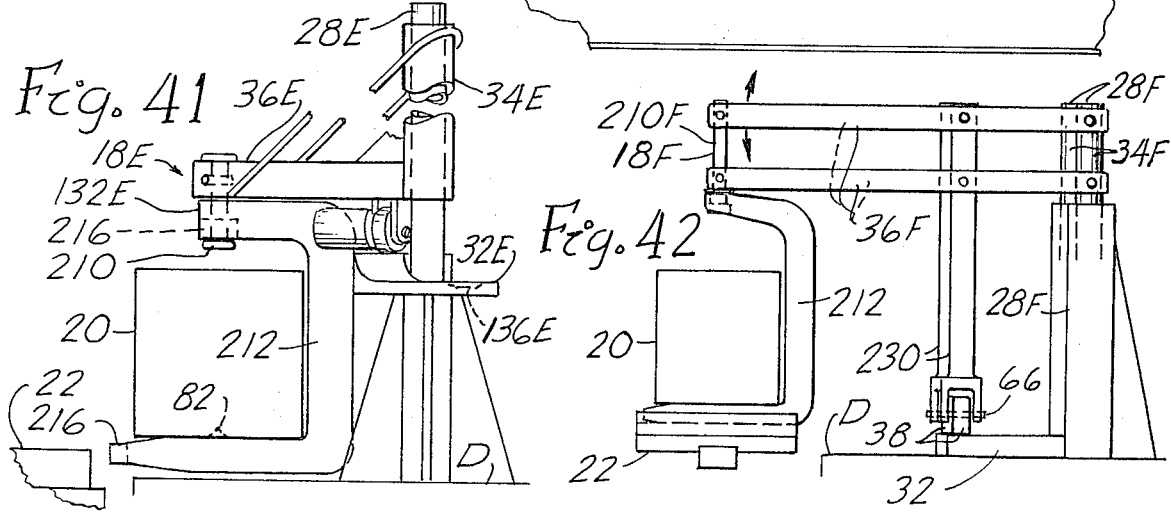

ROTARY PARALLEL ARM LOADER AND SYSTEM

CROSS REFERENCE TO RELATED APPLICATIONS

This application is related to my pending application Ser. No. 957,710, filed Nov. 6, 1978.

It is an object to improve the loader of my U.S. Pat. No. 4,124,129, issued Nov. 7, 1978, by moving the load pivots to the center line of the width of the load which would be the center line of the car for cargo containers or wide loads to reduce off balance loading on the vertical swivels to practically zero. It is a further object to provide parallelogram linkage arms to eliminate the sliding or lifting of the load arms on the pivot posts or columns. It is an object to eliminate the shock acceleration required by the straight-arm forks being engaged by side coupling latches. It is an object to eliminate the coupling latches on the car and the straight coupling fork on the loader and provide either a fork curved in on radius from load end pivot or a lobe or disc on the end of each arm of the loader to engage in an opening between pedestals, which are tapered or curved out toward the side of the car so the loader can be started and engaged in this coupling opening with large tolerance lengthwise the car, so the accuracy for timing start and acceleration is not critical, to gradually start the loader to enter the recesses on the car which couples it to gradually align it accurately for transfer as it progresses to lifting position.

An object is to eliminate the fork frame or load frame between the arms and provide a load turntable on the end of each arm which has a disc wheel which rotates as it engages the side of a car. It is an object to provide low sides or safety curbs for the container cars and storage spots with openings only for the arms to enter for transfer. It is an object to provide locators on the pivot centers of the load turntables to align holes in the container on its lengthwise centerline, so the turntables will not need alignment rods to turn them to align under a load.

It is an object to improve the side coupling of the loader so the force on the coupling will be directed more favorably to move the loader even when the arms are at a lessor angle to the car, to reduce forces of coupling, to be able to side couple a loader that has its load arms close to parallel with the track, so the arms can be short, so the pivot posts can be closer to the track, so the loader can be mounted on a railway car and serve a track or storage row on each side. An object is to cut the cost and mass of the loader so it can be practically built to carry heavier loads and so its arms can rotate within a circle whose diameter is less than the space between chain or roller runs of a conveyor for supporting the load to interface with the loader.

It is an object to provide an improved passenger station for unloading and loading a train nonstop, a station which takes car bodies off railway cars' chassis as the train moves past and aligns them parallel in the station so people can leave through the end of the car at platform level after a car body with people at the opposite end of the station is put on the car chassis to recomplete the train for passenger passage through the train. It is an object to transfer dining cars, sleepers, coaches, mail, express, freight, auto-carrier cars, etc. this way to save switching costs and train time at stations. It is an object to transfer auto-carrying railway cars enroute nonstop at stations having passenger container-of-car transfer so passengers and their autos can be transferred to and from the train nonstop at intermediate points in route.

It is an object to align containers or cars end to platform for end loading to reduce platform and station size for a given capacity.

It is an object to provide hooks on the load arms so they can be engaged for transfer without the loader needing to be powered and further to provide retractable hooks on the loader so the arms can be spaced apart the same distance as on the powered loaders without hooks so cars can be used with either type of loader and vice versa.

It is an object to provide a loader adaptable to material handling or container, railway car body, or vehicle handling, to amusement park devices and to miniature sizes as models and toys.

These, other, and further objects and features and applications are attainable with this invention and should be obvious from study of this specification by those skilled in the art with reference to the drawings wherein:

FIG. 1 is a plan view of a rotary load-unload station along a railroad with container being transferred from a car moving by left to right.

FIG. 2 is a front elevation of the loader of FIG. 1 lifting a container with the car not shown.

FIG. 3 is a side elevation of the car of FIG. 1 with container in phantom.

FIG. 4 is an end view of the car with loader extended thereover to larger scale.

FIG. 5 is a front view of a rotary loader arm lifting on its cam track.

FIG. 6 is a broken front view of the drive for the loader to larger scale.

FIG. 7 is a bottom view of a container.

FIG. 8 is a plan view of a portion of a passenger train passing a station loader engaging a railway passenger car with separable body for transfer.

FIG. 9 is a side elevation of the portion of the passenger train passing the station of FIG. 8.

FIG. 10 is a side elevation of the car engaged in FIG. 8 after its body is lifted at the station.

FIG. 11 is a bottom view of the car's body.

FIG. 12 is a perspective view of the car's chassis platform.

FIG. 13 is an end view of the passenger car with its body on the loader to larger scale.

FIG. 17 is a plan view of a variation of the loader engaged with a railway car.

FIG. 18 is a front elevation of the loader of FIG. 17 with a container.

FIG. 19 is a perspective view of the loader of FIGS. 17-18.

FIG. 20 is a plan view of a loader as in FIGS. 1-16 but without turntables.

FIG. 21 is a plan view of a variation of the loader with back linkage, a load platform, and recessable hooks.

Figure 14:
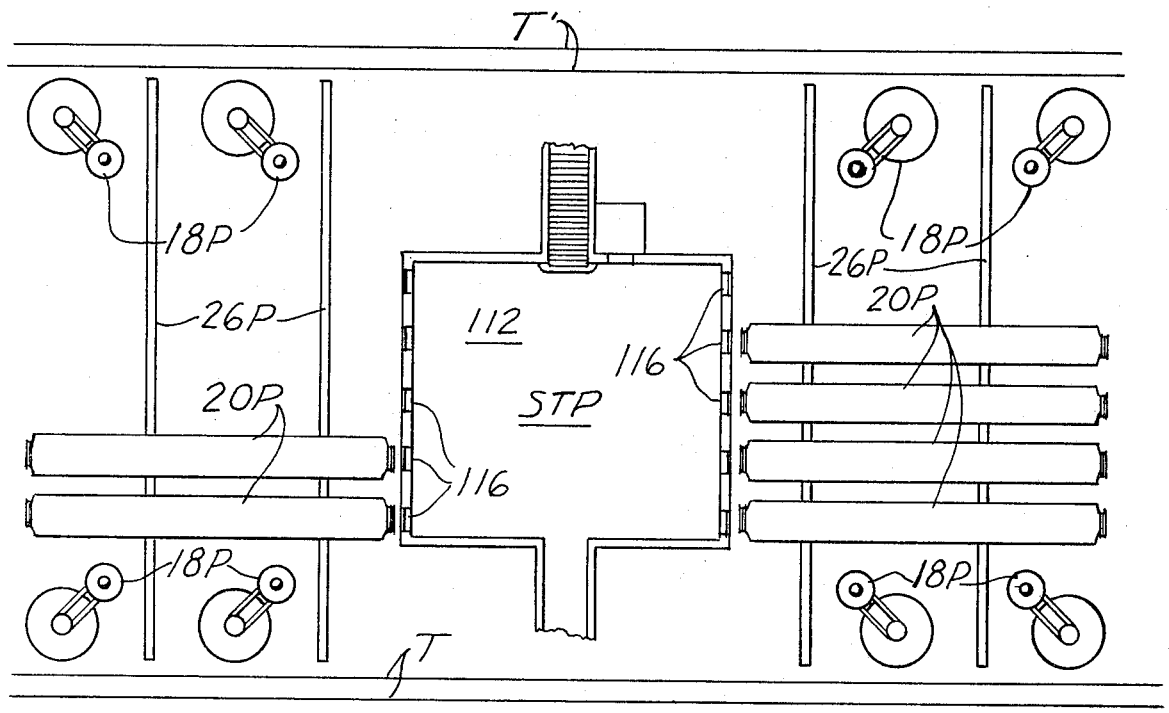
FIGS. 14 and 15 are respectively plan and front elevation of a passenger railway station between tracks of a railway with two loaders connected by a conveyor at each end with passenger car bodies thereon.

FIGS. 22, 23, 24, and 25 are respectively plan, side, back, and front views of an arm of the loader of FIG. 21.

FIG. 26 is a section on lines 26—26 of FIG. 22 also showing the coupling hook end engaging the inside of the load support at the fork finger.

FIGS. 27 and 28 are plan and side views of the retractable fork finger on the loader to larger scale.

FIG. 29 is a schematic plan of an arm of the loader of FIGS. 21–28 in successive positions of engagement by a railway car.

FIG. 30 is a plan view of a railway car mounted loader on a track between a railroad and station storage berths engaging a car in a train for transfer of a container therefrom.

FIG. 31 is a plan view of the loader after reaching out under the container on the car being engaged in FIG. 30.

FIG. 32 is a plan view of the loader of FIGS. 30 and 31 depositing the container in a stationary storage spot.

FIG. 33 is a schematic transfer plan for the station FIGS. 30–32.

FIG. 34 is a side elevation of the loader car.

FIG. 35 is a section on line 35—35 of FIG. 31 with the loader extended under the container on the car to larger scale.

FIG. 36 is a front view taken on line 36—36 of FIG. 32 to show loader arms over a storage berth.

FIGS. 37 and 38 are partial sectional and side views of the loader car taken respectively on lines 37—37 and 38—38 of FIG. 32 to larger scale. The loader in FIG. 37 is rotated clockwise 50°.

FIGS. 39, 40, and 41 are respectively plan, side, and right end views of a double jib loader on a dock along a railway with container ready to load on a car in a train.

FIG. 42 is an end elevation of a variation of the loader of FIGS. 39–41 lifting a container from a vehicle.

Referring to the drawings and in particular to FIGS. 1–6, container transfer station TS along railway track T has a two-arm rotary loader 18 reaching under container 20 on car 22 in train 24 passing the station left to right to unload the train and set the containers down on parallel indexing conveyor 26 or in reverse to lift containers one at a time positioned by the conveyor to swing them parallel onto successive empty berths 27 in a train.

The loader has two round vertical pivot posts 28 embedded in concrete base 30, a concentric cam track 32 around each post, a sleeve 34 mounted on each post to rotate, a parallelogram load arm 36 extending from each sleeve and supported by wheel 38 on the cam track 32 about the post the arm is pivoted from to lift and lower one end of a load. A collar 40 is secured on each post under the sleeve 34 to support it. A beveled gear 42 is secured around the bottom of each sleeve 34 engaging a beveled gear 43 secured on a horizontal shaft 44 through a bearing 46 through the center of each post 28. Beveled gears 42 and 43 and shaft 44 connect the arms parallel. shaft 44 is driven by a reversible spur-geared motor 48 through an overrunning or magnetic clutch 49 and spur gears 50 and 51, FIG. 6.

A turntable 52 on each arm 36 is centered at equal distance from the post about which its supporting arm rotates. Each arm 36 has a turntable support bracket 54 connected in a parallelogram linkage 56 by top bars 58 and bottom bars or channels 59 pivotally mounted at one end on parallel trunnions 60 secured to sleeve 34 and mounted on parallel pins 62 to the load bracket 54 to keep the turntable level when lifted. Bracket 54 extends out forward at top front with horizontal lobe 64 of rolled channel to support the turntable to support an end of a load. Wheel 38 is mounted on axle 66 radial between front and back walls of bracket 54 to roll the arm around track 32 and lift and lower the arm on slope 68 in the track 32 where nearest track T and slope 69 90° counterclockwise therefrom to lift and lower the end of the load for transfer according to the direction the loader is rotated between a car 22 and conveyor 26. The lobe and turntable have the same diameter slightly larger than the width of the load and are spaced apart at a height to engage between pedestals 72 on bed 73 of car 22 which supports the ends of the container for the turntables to enter under with clearance. Preferably a bumper disc wheel 74 with rubber rim at slightly larger diameter than the turntable is mounted on pivot bolt 78 central under lobe 64 to roll on low sides or curbs 80 along the car to reduce contact damage and friction.

The turntable has a conical cylindrical locator 82 on its pivot axis center and each pedestal a locator 83 for engaging in locating holes 84 and 85 respectively and all on the longitudinal center line of the bottom of container 20, FIG. 7.

Figure 15:
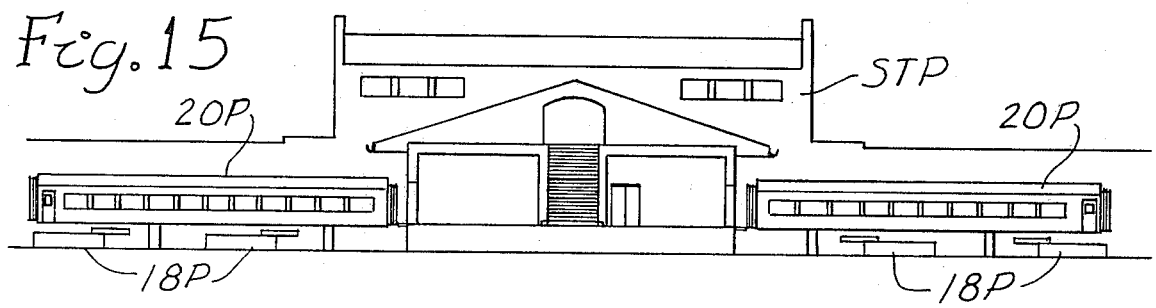
Figure 16:
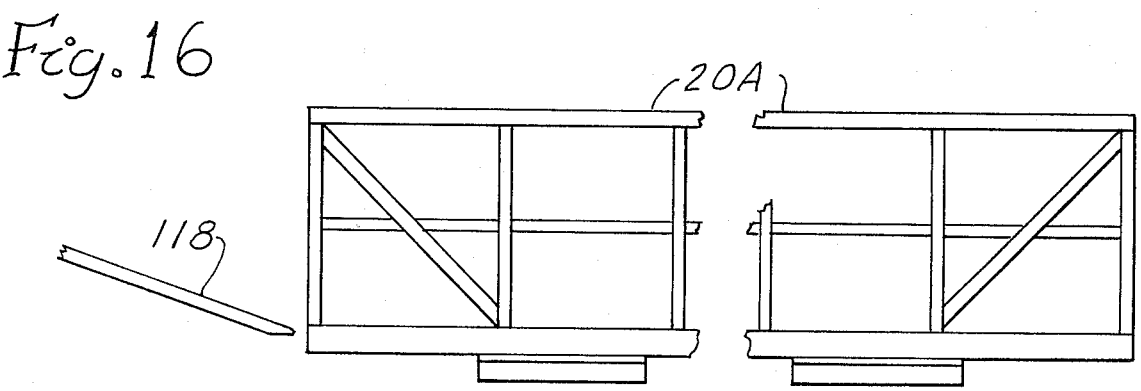
FIG. 16 is a broken side elevation of an auto-carrier car body on a loader at a station.

Conveyor 26 has two roller chain ways 88 at right angles to track T onto which the turntables lower the container. Dogs 90 on roller chain 92 on each way 88 push or pull the containers sideways one container width plus clearance each time the loader deposits or picks up a container from the conveyor. For details of conveyor 26 see FIGS. 3, 15–19 of my U.S. Pat. No. 4,124,129.

VARIATIONS

Corresponding parts of variations are given the same number if the same, or a suffix is added if the part is modified enough to mention.

Referring to FIGS. 8–15, loader 18P has its posts 28 spaced farther apart as shown in FIG. 8 to engage under a passenger railway car body 20P in train 24 on track T to lift the body free of the car's chassis 22P and translate it parallel to an accumulating conveyor 26P at station STP. The loader and accumulating conveyor are as described except for the spacing of the posts and conveyor ways. The passenger railway car has a flat bed chassis 22P, FIG. 12, with two through transverse depressions or rabbets 96, locating lock down devices 98 operated by levers 100 as in FIGS. 19-21 and 23-24 of my pending application Ser. No. 957,710 or other locating means, electrical vertically-disconnecting connectors 102 and drain openings 104. This chassis with couplers and trucks remains in the train when a car body is taken off of it and another is put on by successive loaders 18P at the station. To ready a car body for transfer from a train an attendent locks end doors of adjoining cars and pulls in the end diaphragms 110 and latches them in. The diaphragms preferably are left retracted until the car body is put back on a chassis in another train. Station STP, FIGS. 14–15, has a concourse 112 between tracks T and T' each served by two loaders 18P arranged the first to unload and the second to load in either direction of traffic and two acumulating conveyors 26 connecting the loaders between tracks T and T'. Gates or sliding doors 116 close off the conveyor area except where access to a car end is desired for unloading or reloading. This station can exchange not only coach bodies, sleepers, etc. but also dining, mail, express, and baggage car bodies or a separate station could be provided for different types of service especially for mail and express. The same general station plan can be used for auto-carrier car bodies 20A, FIG. 16, with a lift ramp 118 from the station platform or ground to the car end.

Referring to FIGS. 17-19 for loader 18B used as a track-side dock for holding a load at a dock or building or to load from or unload to trucks as at a team track. Loader 18B is similar to the loaders described except it is not powered and has one fork tine 124 on each arm 36B on the outfacing side to be engaged by hooks 126 on car 22B to unload or load the car of a container or pallet. The pivot posts 28 are closer together to fit the tines 124 between the pedestals 72 on car 22B which are spaced the same as on car 22. The rollers 38 supporting arms 36B run on cam tracks 32 and 32' which intersect at 128 necessitating three levels of the track, FIG. 18, and a shorter leg of bracket 54' supporting the right end than the bracket 54 supporting the left end to keep the loader level. Loader 18B is shown limited to less than half a revolution so the train can completely operate it. Members 58 and 59 of arms 36B, shown as channels, slope up from the pivot post 28 on which mounted to that brackets 54 with discs 74 if added clear over the top of the adjacent pivot post if this loader is to rotate over the pivots. Bars or angle 130 are added to connect load turntables 52B into a loadspreader or platform 132 to coordinate the arms 36B by forming therewith a parallelogram linkage. Locating cones 82 are secured off center on turntables 52B to align in holes 84 in the bottom of the container but are held in alignment by th angles 130 which align arms 36B which do not reach dead centers. Cam tracks 32 and 32' have stops 134 and holding pockets 136, FIG. 19, at each end of rail to hold the loader in position for a railway car 22B with extended hooks 126 to engage the loader in the position shown in phantom in FIG. 17. Couplers 126 are of heavy rod secured on a vertical hinge pin 138 to the bed of the car and extend horizontally along the side of the car and straight up preferably with a roller 140 on the vertical end. They are each swung out fro the car by air pressure connected through valve 141 to cylinder 142 connected between the car frame and a short lever 144 on each rod 126. A compression spring 145 in each cylinder 142 retracts the coupler.

To couple a loader 18B both coupling rods 126 are extended out at about 45° from the side of the berth so the forward coupling rod will engage in back of the coupling tine on the far arm. This rod 126 with roller 140 pulling along the inside curvature of a tine 124 gradually starts the loader to accelerate to car speed as it swings the loader around, engaging both turntables between pedestals 72 as in FIG. 17 before slopes 68 and 68' in cam tracks 32 and 32' lift the loader level as in FIG. 18. The trailing coupling rod will engage the outside of the real fork tine and push the loader out from the car as it continues to the right with the container lifted off. The loader carries it parallel up against a dock or building door not shown. Lobes 64 clear over adjacent post 28.

The loader for side docking can be powered as in FIG. 20 to eliminate the forks and hooks and/or to rotate more than about 180°. This loader 18C is driven by air cylinder 150 connected to rack and pinion drive 152 similarly as in FIGS. 25-26 of my U.S. Pat. No. 4,124,129, to rotate up to over 360°. This loader also has the turntables each replaced by a locating cone 82 as the load pivot center where friction of occasional use or light load is no problem.

Referring to FIGS. 21-29 for a loader 18D with retractable hooks 124R so it can be coupled by car 22C with hooks 126 and have the same pivot centers as the powered loader 18 to which features it can be converted. This loader is basically the same as those described but adds detail features generally applicable to the loaders. Its upper and lower arm members 58 and 59 on each side of each pivot post 28 are connected by bolts 158 through spacing sleeves 160. Parallel alignment arms 162 are secured one on each pivot sleeve 34D on posts 28 and connected by an offset link 164 to carry the loader through dead centers. The loader has a platform of turntables 52D connected by angles 130 to also and otherwise coordinate the arms 36 parallel.

Loader 18D has a hook 124R on the outer rim of each lobe 64D which is opened by spring 168. The hooks are arranged as in FIG. 21 to alternately face the transfer run at ends of travel so only the far one relative to the approaching vehicle can be engaged to start the loader. Each hook 124R is a short tapered channel curved to fit flush in as a piece of the lobe channel 64D and hinged thereto on vertical pin 172 at a point 90° out from the arm 36, so one hook 124R is at each end under the load platform 132 to extend out in the direction of the arms to catch rod 126 to enter it behind the lobe channel so the rod can pull the loader around to engage with the car. If the opposite fork hook 124R is extended, which it is unless pinned closed, the rear rod will enter through the hook opening behind lobe channel 64D of the rear lobe. Each lobe has a vertical partition 174 to confine and guide the hook rod 126 to track around a circumferential arc so whether pushing or pulling it can turn the loader without catching and so the rear hook will leave the circumferential track at the open hook point 124R. Springs 168 yield so the hooks 124R close when engaged against the pedestals or ends of coupling slots 96 on car 22 or 22C.

FIG. 29 shows three successive positions of a car hook 126 engaging a load lobe hook 124R and moving the loader 18D counterclockwise into transfer position over the car. It shows how the pedestal 72 has closed the hook 124R in fully engaged position at the right.

Another feature of this loader generally applicable is the mounting of the turntable 52D on rollers to roll in channels 180 along bracket 54D of arm 36 in and out against spring 181 extending it out. Turntable 52D has a depending locating finger 182 to engage the side of car 22 or 22C to move the table over a cord of the transfer arc to more exactly align it for engaging a load by compensating for the transfer arc, track shift and car positioning thereon, and to dampen car sway.

Referring to FIGS. 30-38, a rotary loader 18 is mounted on a special vehicle or railroad car 190 which runs on track ST between stationary storage spots or berths 27S and railroad track T, on which a car 22 in train 24 is shown moving left to right. The loader has two rotary lift arms 36 each on a sleeve 34 on a vertical pivot shaft 28 secured to the frame of car 190. Arms 36 are each supported by their wheel 38 on a cam track 32 in a well 192 in the frame of the car. Each arm 36 has a turntable 52 pivotally mounted on the outer end with a center locator cone 82 to support and locate the end of a container 20. The arms are coordinated and driven by the same drive as in FIGS. 4-6 with parts given the same numerals where shown. Car 190 has outboard rollers 200 along one or both sides engaged in channel rail 212 secured along one or both sides of track ST to keep the car from tilting when the loader is extended from either side to transfer a load. Vehicle 190 has an operator's cab 204 and is driven along track ST by any suitable drive or can be cable driven from on board or off the vehicle if so designed. The loader and its vehicle is controlled by an operator in a usual manner and is operated while the vehicle 190 is moving to set a container on a stationary berth or railway car and can be stationary or moving when engaged with a moving vehicle.

The berths 27S along the ground and those on car 22 have timber or steel runners 80 curved in on ends to serve as guards to keep the loader from engaging in a wrong spot. If the loader is engaged against a car 22 as shown in FIG. 30 it will not enter under the load until it registers between the aligning end pedestals of the berth; then it rotates counterclockwise around under the container as shown in FIG. 31. The loader is then lifted on its cam track ramps 68 and lifts off the container and carries it counterclockwise and parallel around to set it in the next stationary berth as shown in FIG. 32.

Loader 18, operating counterclockwise in FIG. 30, is shown as having just set a container from the empty berth at the right in car 22 onto the storage berth at the left and has cleared out from under that container and swung against the car to wait to engage in the opening under the container thereon to reach under and lift it off as the train slowly moves to the right. The loader continues revolving and moves to the right at an average speed of half the train speed to set this container on the vacant storage spot to the right as in FIG. 32 and can continue around and around unloading successive containers in the train to successive spots to the right as it follows the train. FIG. 33 shows with arrows the movement of the loader between the train and storage spots in transferring five successive containers numbered 1-5 from the train moving left to right. The operation would be reversed to load the train. Any cars or berths not right for the transfer would be skipped under the control of the operator.

Along track T, FIGS. 39-42, car 22 runs by an industry or warehouse dock D having an overhead double-parallel-jib rotary loader 18E. This two-arm loader lifts container 20 from above so dock D can extend to the railroad and be used for freight car loading etc. Loader 18E has two pivot posts or masts 28E with a cam track 32E of each mast, a sleeve 34E on each mast and an arm 36E which extends out from the bottom of sleeve 34E braced by rod 200 to the top of the sleeve. A wheel 38 on radial shaft 66 is secured under each arm 36E to support it on its cam track 32E which lifts or lowers the sleeve on slope 68 as the arm is rotated. A load spreader 132E is connected by vertical pivot pins 210 to each arm 36E at equal distance from the mast to move in parallel planes through about 130°. The load spreader can be of great variety and is here shown as two C-shaped end members 212 connected at top and bottom ends by cross members 214 and 216 respectively, the bottom member curving out toward the front as it curves between the end members which curve in to meet it to form a bumper to aid alignment as the bottom of the spreader engages between pedestals 72 and under a load on car 22. The end members 212 are pivotally suspended on pins 210 from ends of arms 36E to form a parallelogram linkage. Rollers 220 at ends of pedestals 72 reduce coupling friction. The loader is driven by gearmotor 48E suspended from an arm 36E and coupled to the axle of a wheel 38E.

Loader 18E is driven counterclockwise through the position shown in FIGS. 39-41 to carry container 20 over car 22 moving with the loader coupled to it. The loader rolls down slopes 68 lowering arms 36E together when extended farthest over car 22 to set the container down in the rear berth on pedestals 72 and continues on out from the car to a depression 136E in the cam track which positions the loader for a train from the right. When a container for this dock or station comes on a train from the right the loader is driven clockwise to align the load spreader to engage between the pedestals and lifts the container up off locators 83 and translates it parallel over the dock, where it can be unloaded and or loaded conveniently.

These loaders are preferably controlled as described with FIGS. 14-16 and 25-26 in my U.S. Pat. No. 4,124,129.

Referring to FIG. 42 for a variation of the loader of FIGS. 39-41, each arm 36F has a top and a bottom parallel member 226 and 227 pivotally connected to sleeve 34F on pivot column 28F and to pin 210F to form a parallelogram linkage to eliminate the vertical sliding of the sleeve on the mast. Members 230 and 231 of each arm 36F are also pivotally secured to a leg 230 having a wheel 38 supporting the arm on track 32 on dock D about the base of column 28F. Operation is generally the same as with the other loaders described.

Having thus described some embodiments and applications of my invention I do not wish to be limited to the disclosure herein but intend to cover by the appended claims all modifications and applications which come within the true spirit and scope of this invention.

I claim as my invention:

1. A loader for a load transfer system having a vehicle way, vehicle means thereon for traveling said way and having at least one berth for a load: said loader comprising a plurality of horizontally spaced pivot means each having a vertical axis equally spaced from said way, a plurality of arms each mounted to revolve on one of said pivot means, load pivot and support means having substantially vertical axes parallel to each other carried on the outer end of each of said arms at equal distances from the axis of their respective said pivot means to be moveable with said arm to swing out centrally to substantially the centerline of said berth traveling with respect to said pivot means; a circular cam track substantially concentric about each of said pivot means and having at least one load lift slope; wheel means on each of said arms for running on its associated said cam track to support and lift the associated arm along a transfer arc of movement; means for coordinating said arms to turn substantially parallelly to one another, means for engaging said arms with the vehicle to rotate said arms to transfer a load, said arms being supported to extend over said vehicle way with said load pivot and support means being substantially centered transversely on the berth center line when fully extended over the vehicle.

2. A loader as in claim 1, said load pivot being a locating pin.

3. A loader as in claim 1, said load pivot and support means being a circular turntable on each of said arms.

4. A loader as in claim 3, said turntable having a central locating pin to align to engage a load which ever way the turntable is turned.

5. A loader as in claim 1, said pivot means each comprising a stationary pivot post, a sleeve over each said post, said coordinating means being a first beveled gear concentric on the axis of each said post and secured on the lower end of each said sleeve, a shaft running through at least one said pivot post under the said first beveled gear on the sleeve on that post and second beveled gears secured on said shaft one engaging each said first beveled gear to turn said arms parallelly.

6. A loader as in claim 1, each of said arms including a parallelogram linkage as viewed from the side to brace the said load pivot and support means thereon to lift and lower substantially levelly through parallel planes when the supporting said arm is lifted and lowered.

7. A loader as in claim 1 and a vehicle on which the loader is mounted to transfer and carry a load.

8. A loader as in claim 1, there being two said pivot means for a full size load of the order 8-10' wide by 20-100' long spaced apart less than the length of the load and having said arms approximately 10'-4" long between the center of each of said pivot means and the center of their load pivot.

9. A loader as in claim 1, said vehicle means being a railway car with rabbets running transversely through for side coupling keying said arms of the loader therein.

10. A loader as in claim 9 wherein said car has a detachable body for setting on the car's bed for said loader to transfer.

11. A loader as in claim 10 wherein said car body is a passenger railway car body.

12. A loader as in claim 1, each said arm extending out and up from its said pivot means to clear the end of the arm over the adjacent pivot means.

13. A loader as in claim 1, each said cam track being on a different level, one a high and the adjacent a lower cam track which intersects the higher track at grade and each have a corresponding slope in the same direction to the higher level, legs at said loader spaced at a distance the same as the slopes are apart and being on a different height to both support the loader substantially level on said wheel means and to run around each said track with one leg on each said cam track.

14. A loader as in claim 1, said arms each having horizontal circular coupling means setting the outer and side boundary limits of the arm where engaged with said vehicle means to key said arms in openings between transverse walls on said vehicle means for keying with the loader to move through the transfer arc in alignment with the vehicle for transfer of a load.

15. A loader as in claim 1, said engaging means including a coupling fork or tine extending from each said arm out endward and curving around on an arc having a center approximately on the load pivot center for engagement on the concave side by a hook from the vehicle means to pull the loader around to engage the vehicle means for transfer and for the fork arm at the rear to be pushed by a similar hook out from the vehicle means after transfer.

16. A rotary loader as in claim 1, each outer said load arm having a load lobe on its outer end and a fork hook extending out from the lobe and centered approximately 90° endward to the arm, said hook being hinged in the perimeter of said lobe to recess as a segment flush therein and to open with tapered lip out to engage a vehicle mounted hook, and resilient means for extending said hook out open but so as to recess in when the loader is engaged between pedestals, said lobe having a track or slot for a vehicle mounted hook to engage and follow behind a portion of the perimeter opened by said segment as its door.

17. A loader as in claim 1, said arm having a substantially horizontal coupling disc wheel mounted to rotate on at least one said arm.

18. A rotary loader comprising in combination a plurality of substantially vertical pivot means, arm means extending from each said pivot means and secured to revolve thereon, means for coordinating said arm means to revolve substantially parallel to one another, a load support on the outer end of each said arm means from its pivot means, said arm means including parallel linkage members connecting each said load support into a parallelogram linkage operable in vertical planes for bracing and guiding the said support to move through planes parallel to each other, means for lifting and lowering each said load support simultaneously and equally for lifting a load equally between each said load support, and pivot means on each said load support to engage a load to pivot on the load support to translate substantially parallelly as said arms are revolved substantially parallelly.

19. A loader as in claim 18 having two said arms.

20. A load support arm for a rotary loader having pivot means having a substantially vertical axis, a load bracket on said arm away from said pivot means, load pivot means mounted on said bracket for supporting a load to align for transfer, said arm including upper and lower arm members pivotally connected between said pivot means and said bracket to form a parallelogram linkage to operate in vertical planes, and cam means for supporting said bracket and the ends of said arm members to lift and lower said arm when rotated for transfer of a load.

* * * * *